United States Patent [19]

Kawakubo et al.

[11] 4,290,288
[45] Sep. 22, 1981

[54] DEVICE FOR NARROWING THE BREADTH OF A SHEET SPRING MATERIAL IN AN APPARATUS FOR MANUFACTURING A TAPER LEAF SPRING

[75] Inventors: Mitsushige Kawakubo; Yoshihiro Sakai; Akira Ohno, all of Yokohama, Japan

[73] Assignee: NHK Spring Co., Ltd., Yokohama, Japan

[21] Appl. No.: 43,837

[22] Filed: May 30, 1979

[30] Foreign Application Priority Data

May 30, 1978 [JP] Japan .................................. 53-64618

[51] Int. Cl.³ .......................... B21B 37/14; B21B 1/20
[52] U.S. Cl. ........................................... 72/7; 72/240; 72/205
[58] Field of Search ................... 72/240, 20, 21, 7, 10, 72/199, 366

[56] References Cited

U.S. PATENT DOCUMENTS

| 2,655,823 | 10/1953 | Cozzo | 72/240 X |
| 3,081,653 | 3/1963 | Kincaid | 72/240 X |
| 3,793,868 | 2/1974 | Wilson | 72/366 X |

FOREIGN PATENT DOCUMENTS 1329312  9/1973  United Kingdom .................. 72/240

Primary Examiner—Milton S. Mehr
Attorney, Agent, or Firm—Fleit & Jacobson

[57] ABSTRACT

A device for narrowing the breadth of a sheet spring material in an apparatus for manufacturing a taper leaf spring by which the sheet spring is previously subjected to breadth narrowing operation with edge rollers before taper rolling.

A shape for narrowing the breadth of a sheet spring material is calculated so that a product after rolling may be within the tolerance. Then, a shape of template thus obtained is detected by a pair of detecting rollers to regulate the interval between the work rollers automatically before taper rolling.

4 Claims, 10 Drawing Figures

DEVICE FOR NARROWING THE BREADTH OF A SHEET SPRING MATERIAL IN AN APPARATUS FOR MANUFACTURING A TAPER LEAF SPRING

BACKGROUND OF THE INVENTION

Field of the Invention

This invention relates to a device for executing operation of breadth narrowing compensating for the expansion of the breadth on both sides of a sheet spring material before taper rolling work on the sheet spring material in order to prevent the breadth expansion to be caused by the taper rolling.

According to conventional methods of manufacturing a sheet spring, since the thickness of the sheet spring is always taken as basis, taper rolling work results in expansion of the breadth. Consequently, these expanded portions have to be adjusted by means of cutting and abrading, grinding and abrading, etc. That is, as is shown in FIG. 1, (a) and (b), a process of pinching of the breadth by means of press or a process of breadth narrowing by means of press is required. Further, problems exist in regard to wear and tear of the press mold, maintenance of dimensions and adjustment of fabrication. At times, there appears such a defect that an accident of interpenetration of scales happens.

Moreover, there are many problematical points such that the rate of effective utilization of material is low, unevenness appears in the sheet thickness or buckling occurs to form such a cross sectional shape as shown in FIG. 2. There is also such a defect that emerges after taper rolling, bending or winding to the sheet breadth direction. Many work units are needed to correct these failures. Furthermore, metallurgical instruments for performing heat treatment to sheet springs after their formation have to be particular with each kind of product. Hence, the expenses increase and there are many issues in respect of such control problems as the improvement and the stabilization of product quality.

SUMMARY OF THE INVENTION

The first object of this invention is to furnish a device for breadth narrowing of a sheet spring material in a taper leaf manufacturing apparatus by which in the step before rolling in the sheet thickness direction, edge rolls are employed to perform breadth narrowing of the sheet spring material to be worked, a template is prepared at that time in order to measure the breadth of the sheet spring and the interval between the edge rolls is automatically adjusted so that in the condition after taper rolling, there does not appear expansion of the breadth at the worked sheet spring.

The other objects and characteristics of this invention will be clarified in the following explanation which will be made with reference to the accompanying drawings.

BRIEF DESCRIPTION OF THE DRAWINGS

In the detailed description of the preferred embodiments of the invention presented below, reference is made to the accompanying drawings in which:

FIG. 3 presents drawings indicating the processes of this invention.

DESCRIPTION OF THE PREFERRED EMBODIMENTS

Figure 1:
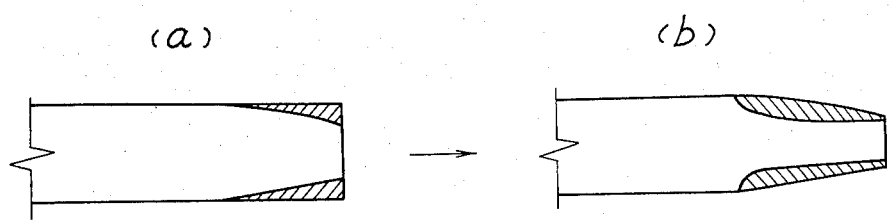
FIG. 1, (a) and (b), are plan views showing the order of processes according to conventional techniques.
Figure 2:
FIG. 2 is a sectional view of FIG. 1.
Figure 3A:
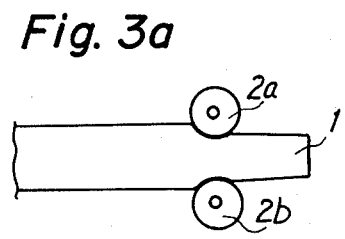
FIG. 3(a) shows a top view of a sheet of spring material, being subjected to a breadth narrowing operation.
Figure 3B:
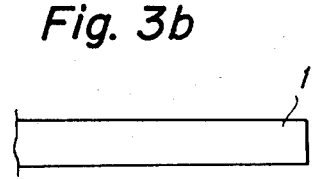
FIG. 3(b) shows a top view of a sheet of spring material, being rolled to taper.
Figure 3C:
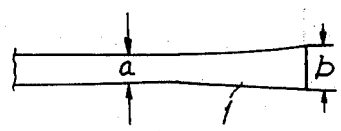
FIG. 3(c) shows a side view of a sheet of spring material, being subjected to a breadth narrowing operation.
Figure 3D:
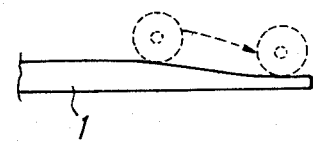
FIG. 3(d) shows a side view of a sheet of spring material, being rolled to taper.
Figure 4:
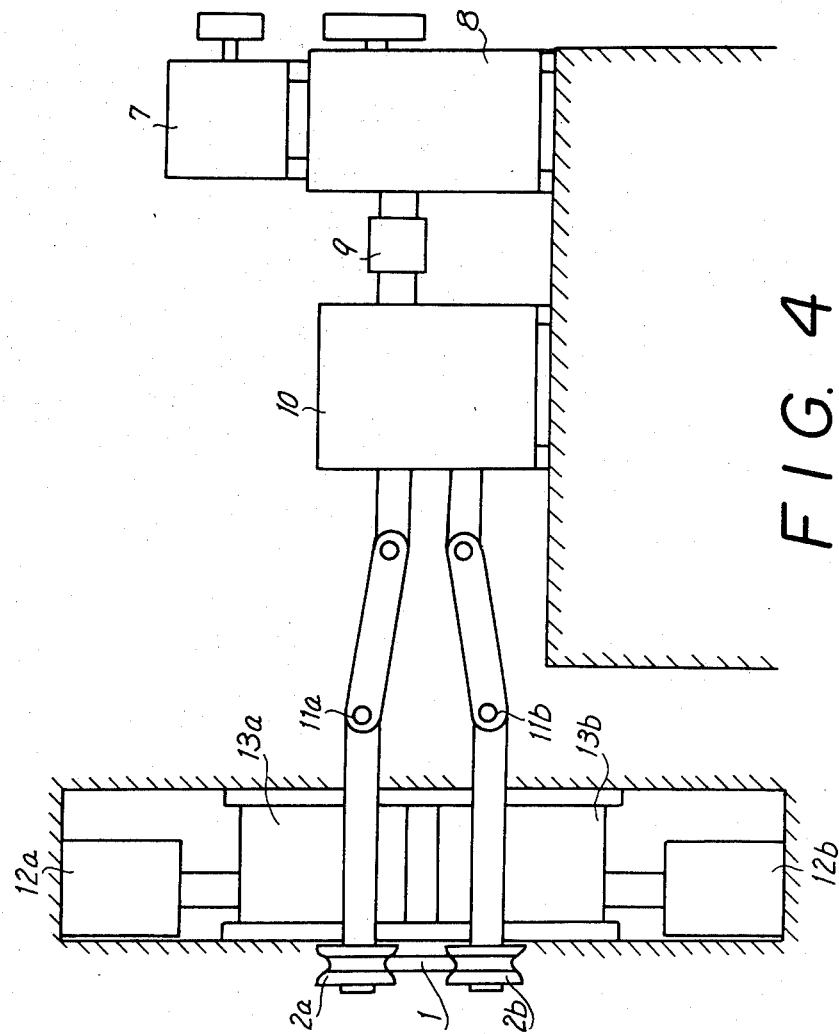
FIG. 4 is a diagram exemplifying one embodiment of this invention.
Figure 5:
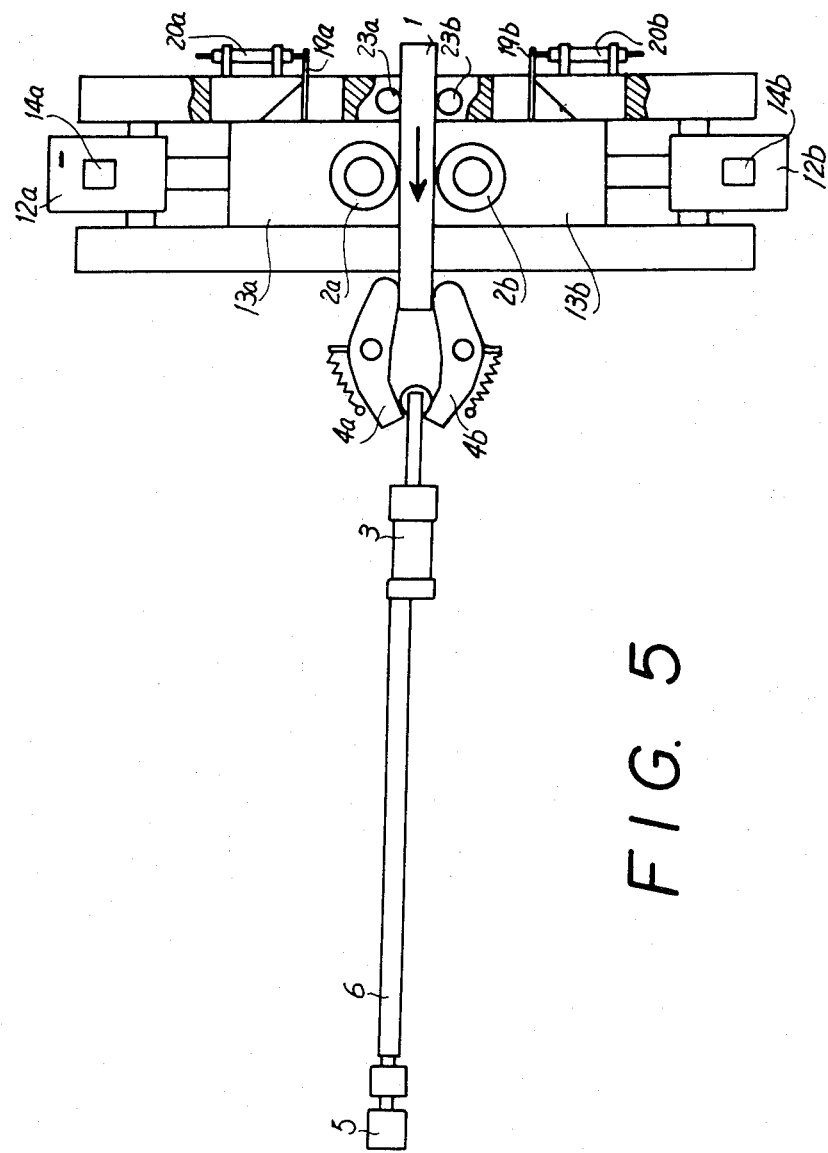
FIG. 5 is a plan view of the essential parts of the embodiment shown in FIG. 4.
Figure 6:
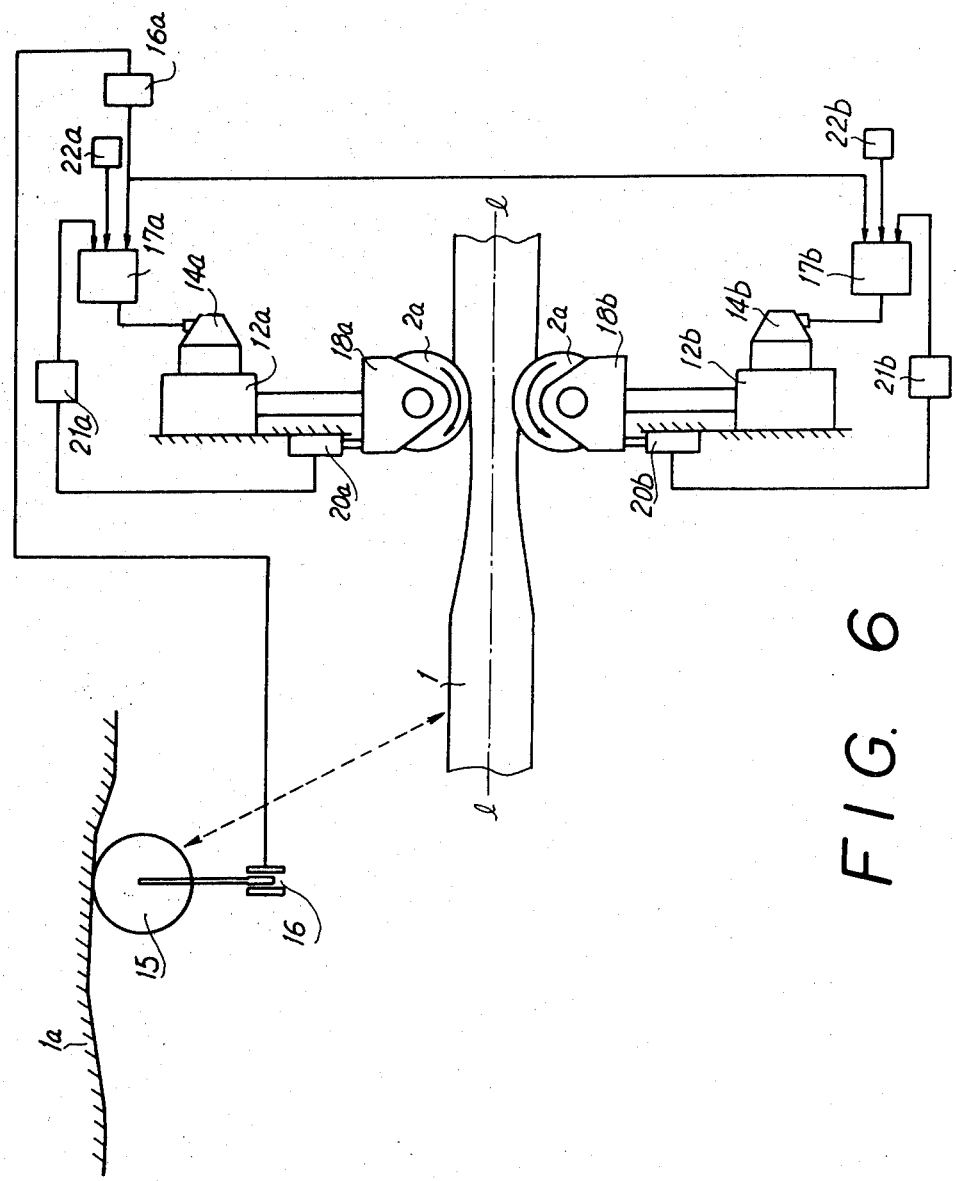
FIG. 6 is an operational block diagram of the essential parts exemplifying one embodiment of this invention.

This invention furnishes a breadth narrowing device in a sheet spring manufacturing apparatus by which before a sheet spring material being rolled to taper as in FIG. 3(b), the sheet spring material 1 is beforehand subjected to breadth narrowing operation as in FIG. 3(a).

In the drawings, mark 1 denotes a sheet spring material, which is held between a pair of left and right work rolls, 2a and 2b, before taper rolling work in the sheet thickness direction and is also clamped in the sheet breadth direction by clamp nails 4a and 4b operating by means of an oil pressure cylinder 3 for clamping, etc.

In this condition, an oil pressure motor 5 is revolved, and through the intermediary of a screwing bar 6, the sheet spring material 1 is moved away to the arrow direction by each crank base (not shown in the drawings).

Said work rolls 2a and 2b are of a shape having a groove. Motive power is transmitted from an electric motor 7 to a speed reduction machine 8, and further through the intermediary of a coupling 9, a cam mechanism 10 and movable couplings 11a and 11b, the above work rolls 2a and 2b are revolved and driven.

It is so arranged that a detecting roller 15 sends displacement variations on a template 1a as signals to a differential transformer 16 and to an amplifier 16a for the differential transformer. By receiving variation signals amplified by servoamplifiers 17a and 17b, the amounts of variations of the oil pressure cylinders 12a and 12b due to the servovalves 14a and 14b are controlled.

Cores of variation detecting differential transformers 20a and 20b are respectively fixed to roll brackets 18a and 18b of said edge rolls 2a and 2b through brackets 19a and 19b. It is arranged to feed back the movement of work rolls 2a and 2b through the intermediary of amplifiers for differential transformers 21a and 21b so as to correct the errors of displacements of work rolls 2a and 2b relative to the variations of the template 1a.

It is a principle that work rolls 2a and 2b start from positions symmetrical to the center line 1—1 of a sheet spring 1 and move symmetrically. However, in view of the case when this condition collapses due to wear and tear of work rolls 2a and 2b, etc., potentiometers 22a and 22b for bias adjustment are respectively provided for adjustments of the positions of the work rolls 2a and 2b.

The driving parts of work rolls 2a and 2b of thus constituted breadth narrowing device are always being driven by an electric motor 7 so that a sheet spring 1 is sent out at a prescribed speed at the time of rolling. Inasmuch as rolls 2a and 2b are made to be shaped like rolls having grooves, the efficiency of fitting of a sheet spring material is high, the diameter of rolls can be made smaller and motive power of the electric motor 7 is allowed to be smaller.

The drawing-out of the sheet spring 1 is performed by clamping by means of clamp nails 4a and 4b. By establishing the drawing-out speed to be somewhat quicker than the speed at which a sheet spring comes out of work rolls 2a and 2b, tension is given to the sheet spring 1 during taper rolling work. Simultaneously, because of regulating the sheet spring at three places, clamp nails 4a and 4b, work rolls 2a and 2b and guide rolls 23a and 23b, relative to the sheet breadth direction, winding (bending) of the sheet spring 1 caused by differences of the revolving speeds of the work rolls 2a and 2b can be controlled.

Consequently, the following advantages are acquired.

(1) The rate of utilization of sheet spring material is heightened by more than 5%.

(2) Variations of the sheet thickness after the formation of a sheet spring become less and bending at the time of taper rolling can be prevented. Thus, the quality is stabilized.

(3) Remarkable descale effect on a plane subjected to taper rolling is expected. At the time of taper rolling, intermingling of scales does not occur and the quality is improved.

(4) Since the metallurgical instruments can be made common, the reduction of costs required for manufacturing them and the shortening of time for work processes become possible.

(5) The reduction of costs required for trial manufacture accompanying the establishment of a new product and the shortening of time for this process become possible.

What is claimed is:

1. A device for narrowing the breadth of a sheet spring material in an apparatus for manufacturing a taper leaf spring which comprises the following: for performing rolling for breadth narrowing to both sides of a sheet spring material prior to taper rolling of both ends of said spring sheet material, a pair of work rolls for said breadth narrowing, means to regulate the interval between said pair of work rolls, a template to determine the interval between said pair of work rolls, means to detect the shape of said template as an electric signal and transmit same as mechanical energy to the means for regulating the interval between the work rolls, means to detect variations in the regulation of the interval between said work rolls as electric signals, compare them with electric signals based on variations indicated in the shape of the templete, determine errors and give correcting signals to the means for regulating the interval between the work rolls, and means to give tension to a sheet spring material and simultaneously control bending of the sheet spring material during processing work.

2. A device for narrowing the breadth of a sheet spring material in an apparatus for manufacturing a taper leaf spring according to claim 1 wherein the means to regulate the interval between the pair of work rolls comprise oil pressure cylinders which operate roll holders and the supply of oil to said oil pressure cylinders is controlled by servovalves.

3. A device for narrowing the breadth of a sheet spring material in an apparatus for manufacturing a taper leaf spring according to claim 1 wherein the means to detect the shape of the template as electric signal and transmit same as mechanical energy is composed of a differential transformer, an amplifier for the differential transformer and servoamplifiers; and wherein servovalves which control operation of said means to regulate the interval are operated by signals coming from said servoamplifiers.

4. A device for narrowing the breadth of a sheet spring material in an apparatus for manufacturing a taper leaf spring according to claim 1 wherein the means to detect variations in the regulation of the interval comprise differential transformers for detecting variations which catch motion of the pair of work rolls and represent it as electric signal, and they make feedback to said means to regulate the interval by way of an amplifier for each differential transformer.

* * * * *